United States Patent
Bi et al.

(10) Patent No.: US 11,288,329 B2
(45) Date of Patent: Mar. 29, 2022

(54) METHOD FOR OBTAINING INTERSECTION OF PLURALITY OF DOCUMENTS AND DOCUMENT SERVER

(71) Applicant: Beijing Sankuai Online Technology Co., Ltd, Beijing (CN)

(72) Inventors: Chenglong Bi, Beijing (CN); Wenbin Pan, Beijing (CN)

(73) Assignee: Beijing Sankuai Online Technology Co., Ltd, Beijing (CN)

( * ) Notice: Subject to any disclaimer, the term of this patent is extended or adjusted under 35 U.S.C. 154(b) by 215 days.

(21) Appl. No.: 16/622,293

(22) PCT Filed: Dec. 29, 2017

(86) PCT No.: PCT/CN2017/120062
§ 371 (c)(1),
(2) Date: Dec. 13, 2019

(87) PCT Pub. No.: WO2019/047437
PCT Pub. Date: Mar. 14, 2019

(65) Prior Publication Data
US 2020/0210493 A1    Jul. 2, 2020

(30) Foreign Application Priority Data

Sep. 6, 2017  (CN) .......................... 201710797899.8

(51) Int. Cl.
*G06F 16/951* (2019.01)
*G06F 16/22* (2019.01)
(Continued)

(52) U.S. Cl.
CPC ........ *G06F 16/951* (2019.01); *G06F 16/2246* (2019.01); *G06F 16/24578* (2019.01);
(Continued)

(58) Field of Classification Search
CPC ........ G06F 16/951; G06F 16/31; G06F 16/93; G06F 16/2246; G06F 16/953; G06F 16/24578; G06F 16/334
See application file for complete search history.

(56) References Cited

U.S. PATENT DOCUMENTS 6,658,626 B1 *  12/2003  Aiken ................... G06F 40/289
715/205
8,874,663 B2 *  10/2014  Stein .................... G06Q 10/107
709/206
(Continued)

FOREIGN PATENT DOCUMENTS

| CN | 1858737 A | 11/2006 |
|---|---|---|
| CN | 102201007 A | 9/2011 |

(Continued)

OTHER PUBLICATIONS

Hagai et al.; "Fast Set Intersection and Two-Patterns Matching"; Theoretical Computer Science, 2010—Elsevier (Year: 2010).*

(Continued)

*Primary Examiner* — Dennis Truong
(74) *Attorney, Agent, or Firm* — Kilpatrick Townsend & Stockton LLP

(57) ABSTRACT

The present disclosure provides a method and an apparatus for obtaining an intersection of a plurality of documents and a readable storage medium. According to an example in the method, for at least two document collections for which an intersection needs to be obtained in a search, document collection lengths of the document collections are obtained, and lengths of the at least two document collections are compared. In this way, an intersection algorithm for obtaining a document intersection may be determined according to a length difference between the at least two document collections. For example, when the document collection lengths of the at least two document collections meet a (Continued)

preset condition, an element in a document collection with the shortest length may be used as a query element to sequentially traverse the remaining document collections.

13 Claims, 7 Drawing Sheets

(51) Int. Cl.
  *G06F 16/2457* (2019.01)
  *G06F 16/93* (2019.01)
  *G06F 16/953* (2019.01)
  *G06F 16/33* (2019.01)
  *G06F 16/31* (2019.01)
(52) U.S. Cl.
  CPC .............. *G06F 16/31* (2019.01); *G06F 16/93* (2019.01); *G06F 16/953* (2019.01); *G06F 16/334* (2019.01)

(56) References Cited

U.S. PATENT DOCUMENTS

| | | | |
|---|---|---|---|
| 9,501,506 B1* | 11/2016 | Fontoura | G06F 16/328 |
| 2003/0172048 A1 | 9/2003 | Kauffman | |
| 2005/0060643 A1* | 3/2005 | Glass | G06F 40/169 715/205 |
| 2005/0138005 A1 | 6/2005 | Roux et al. | |
| 2008/0195597 A1* | 8/2008 | Rosenfeld | G06F 16/40 |
| 2008/0294597 A1* | 11/2008 | Bourdoncle | G06F 16/328 |
| 2009/0006438 A1* | 1/2009 | Tunkelang | G06F 16/245 |
| 2009/0028441 A1* | 1/2009 | Milo | G06F 16/35 382/218 |
| 2009/0113309 A1* | 4/2009 | Krauthgamer | G06F 16/2456 715/739 |
| 2009/0313238 A1* | 12/2009 | Merrigan | G06F 16/2272 |
| 2010/0125614 A1* | 5/2010 | D'Urso | H03M 7/30 707/803 |
| 2010/0268708 A1* | 10/2010 | Zhang | G06F 16/24578 707/726 |
| 2011/0314045 A1* | 12/2011 | Konig | G06F 16/334 707/769 |
| 2012/0310915 A1* | 12/2012 | Yang | G06F 16/3341 707/711 |
| 2016/0055143 A1* | 2/2016 | Goel | G06F 16/328 715/229 |
| 2016/0378805 A1* | 12/2016 | Hopcroft | G06F 16/334 707/715 |
| 2017/0075958 A1* | 3/2017 | Duffy | G06F 16/2455 |
| 2017/0185671 A1* | 6/2017 | Zhao | G06F 16/334 |
| 2017/0193081 A1* | 7/2017 | Tang | G06F 16/3334 |
| 2017/0270114 A1* | 9/2017 | Dai | G06F 16/90344 |
| 2018/0307758 A1* | 10/2018 | Reiser | G06F 16/951 |
| 2020/0210493 A1* | 7/2020 | Bi | G06F 16/951 |
| 2020/0279189 A1* | 9/2020 | Yamaguchi | G06Q 10/10 |

FOREIGN PATENT DOCUMENTS

| | | | | |
|---|---|---|---|---|
| CN | 102750393 A | | 10/2012 | |
| CN | 102810096 A | | 12/2012 | |
| CN | 102810096 B | | 3/2016 | |
| CN | 106156000 A | | 11/2016 | |
| CN | 106933824 A | * | 7/2017 | ........... G06F 16/325 |
| JP | H08329112 A | | 12/1996 | |
| JP | 2014519123 A | | 8/2014 | |
| WO | 2016173366 A1 | | 11/2016 | |

OTHER PUBLICATIONS

Cohen et al.; Fast Set Intersection and Two-Patterns Matching; arXiv:0909.5146v3 [cs.DS] Mar. 11, 2010 (Year: 2010).*
TW Patent Office, Notice of Rejection of decision issued in Application No. 107111378, dated Apr. 15, 2020, 10 pages. (Submitted with Partial Translation).
ISA State Intellectual Property Office of the People's Republic of China, Written Opinion of the International Searching Authority Issued in Application No. PCT/CN2017/120062, dated Jun. 5, 2018, WIPO, 9 pages.
Japanese Patent Office, Office Action issued in Application No. 2019-568694, dated Feb. 24, 2021, 8 pages. (Submitted with Machine Translation).
ISA State Intellectual Property Office of the People's Republic of China, International Search Report Issued in Application No. PCT/CN2017/120062, dated Jun. 5, 2018, WIPO, 4 pages.
State Intellectual Property Office of the People's Republic of China, Office Action and Search Report Issued in Application No. 201710797899.8, dated Aug. 26, 2019, 9 pages,(Submitted with Partial Translation).
TW Patent Office, Office Action Issued in Application No. 107111378, dated Sep. 27, 2019. 13 pages. (Submitted with Partial Translation).
"Calculate the Intersection of Merged Postings Lists in Lucene", Link to this article: https://blog.csdn.net/ToBeAndNotToBe/article/details/5904467 , Sep. 25, 2010, 2 pages.
Thailand Patent Office, Office Action Issued in Application No. 1901007779, dated Jan. 5, 2022, 4 pages. (Submitted with Machine Translation).

* cited by examiner

METHOD FOR OBTAINING INTERSECTION OF PLURALITY OF DOCUMENTS AND DOCUMENT SERVER

CROSS-REFERENCE TO RELATED APPLICATION

The patent application is a U.S. National Stage of International Application No. PCT/CN2017/120062, filed on Dec. 29, 2017, designating the United States, which claims priority to Chinese Patent Application No. 201710797899.8, filed on Sep. 6, 2017 and entitled "METHOD, APPARATUS, AND DEVICE FOR OBTAINING INTERSECTION OF PLURALITY OF DOCUMENTS AND READABLE STORAGE MEDIUM", the content of each of which is incorporated herein by reference in its entirety.

TECHNICAL FIELD

Embodiments of the present disclosure relate to the field of search engine technologies, and in particular, to obtaining an intersection of a plurality of documents.

BACKGROUND

A search engine may have accumulated tens of millions to billions of web pages on the World Wide Web (WEB) and have indexed every word in the web pages to establish an index database. When a user searches for a keyword, all web pages with page content containing the keyword are found as search results.

A method of linearly obtaining an intersection of a plurality of documents is adopted in a widely applied open-source search engine, for example, Lucene. That is, after all document collections are sorted, the first element in the first document collection is used to start traversing the other document collections. In this case, the element may be found in a current document collection, and a next document collection continues to be traversed. If the element is not found, a next element in the current document collection is used as a query element to re-traverse the other document collections. This process is repeated until an element, that is, a document, that exists in all the document collections is found. This manner keeps being repeated until one of the document collections has been completely traversed, and a process of obtaining an intersection of a plurality of document collections is finished.

During the traversal of each document collection, if a currently compared element does not meet a requirement, that is, the currently compared element is not a query element, a next element in this document collection needs to be sequentially compared. However, when a length difference between different document collections is greater than a threshold, such a search is usually unnecessary. This is because for the obtaining of an intersection of a plurality of document collections, one element that does not exist in one document collection cannot be an element of the intersection. Therefore, the efficiency of obtaining an intersection of documents may be relatively low.

SUMMARY

The present disclosure provides a method and an apparatus for obtaining an intersection of a plurality of documents and a readable storage medium, so that even when a length difference between different document collections is greater than a threshold, a document intersection can still be obtained with relatively high efficiency.

According to a first aspect of the present disclosure, a method of obtaining an intersection of a plurality of documents is provided. The method includes: for at least two document collections for which an intersection needs to be obtained in a search, obtaining document collection lengths of the document collections; determining, according to a length difference between the at least two document collections, an intersection algorithm for obtaining a document intersection; and obtaining a document intersection of the at least two document collections by using the determined intersection algorithm.

According to a second aspect of the present disclosure, a document server is provided. The document server includes: a processor; and a non-transitory computer readable storage medium, where the non-transitory computer readable storage medium stores machine executable instructions executable by the processor. The processor is enabled by the machine executable instructions to: for at least two document collections for which an intersection needs to be obtained in a search, obtain document collection lengths of the document collections; determine, according to a length difference between the at least two document collections, an intersection algorithm for obtaining a document intersection; and obtain a document intersection of the at least two document collections by using the determined intersection algorithm.

According to a third aspect of the present disclosure, a non-transitory computer readable storage medium is provided. The non-transitory computer readable storage medium stores machine executable instructions executable by a processor. When the machine executable instructions in the non-transitory computer readable storage medium are executed by a processor in a document server, the document server is capable of performing the foregoing method of obtaining an intersection of a plurality of documents.

The embodiments of the present disclosure provide a method and an apparatus for obtaining an intersection of a plurality of documents and a readable storage medium. For at least two document collections for which an intersection needs to be obtained in a search, when document collection lengths of the at least two document collections meet a preset condition, an element in a document collection with the shortest length is used as a query element to sequentially traverse the remaining document collections. Therefore, the efficiency of obtaining a document intersection can be effectively improved, and a response time of a search engine for a user is shortened.

BRIEF DESCRIPTION OF THE DRAWINGS

To describe the technical solutions of the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art according to the embodiments of the present disclosure without creative efforts shall fall within the protection scope of the present disclosure.

A method of obtaining an intersection of a plurality of documents provided in the embodiments of the present disclosure may be applied to search engine technologies, and an objective thereof is: according to query content input by a user into a search engine interface, performing word segmentation on the query content; generating a document collection corresponding to each word segment by matching the word segment against corresponding documents; obtaining an intersection of all the document collections to obtain a document intersection; and returning the document intersection to the user.

A search engine technology is an Internet communications technology. A server side provides content and establishes indexes for the content on the Internet. When a user uses a client to send a search request to a server, the server may search the indexes for content according to a keyword in the search request, and then return the found content to the client for display.

Figure 1:
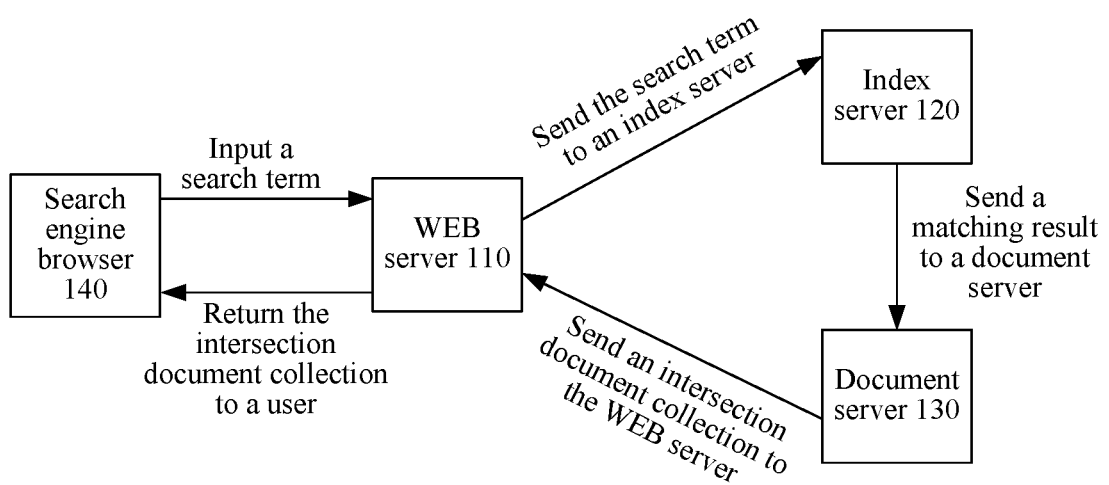
FIG. 1 is a schematic structural diagram of a search engine according to an embodiment of the present disclosure.

Referring to FIG. 1, a search engine may usually include a WEB server 110, an index server 120, and a document server 130. The document server 130 may store document information.

After a user inputs a search term into a search engine browser 140, the WEB server 110 receives the search term and sends the search term to the index server 120. Subsequently, the index server 120 performs syntax word segmentation processing on the search term, matches each word segment against corresponding documents in an index database, and sends a matching result to the document server 130. The document server 130 may then establish a document collection corresponding to each word segment according to the matching result, obtain intersections of document collections that separately correspond to all the word segments to obtain a document intersection; and return the document intersection to the search engine browser 140 by using the WEB server 110. In this way, the search engine browser 140 may display documents in the document intersection to the user.

Common terms in the method of obtaining an intersection of a plurality of documents provided in the present disclosure are as follows:

Document: A processing object of a search engine is usually an Internet web page. The concept of "document" is wider and represents a storage object that exists in a text form. Compared with a web page, a document may include more forms. For example, files in different formats such as Word, PDF, html, and XML may all be referred to as documents. For another example, an email, a short message service message or a microblog may also be referred to as a document. In the present disclosure, each document is correspondingly provided with a document identifier used to identify the document.

Document collection: A set formed by several documents is referred to as a document collection. Massive Internet web pages and a large number of emails are both specific examples of document collections.

Parse tree: A parse tree is a graphic representation of the structure of a statement and represents a derivation result of the statement. The parse tree can facilitate understanding of levels of a syntactic structure of the statement. To be brief, the parse tree is a tree formed by derivation according to a rule.

Leaf node: A leaf node is a bottom-layer node of a parse tree and includes no lower-layer node. In the present disclosure, a leaf node is a word segment of a search term.

Figure 2:
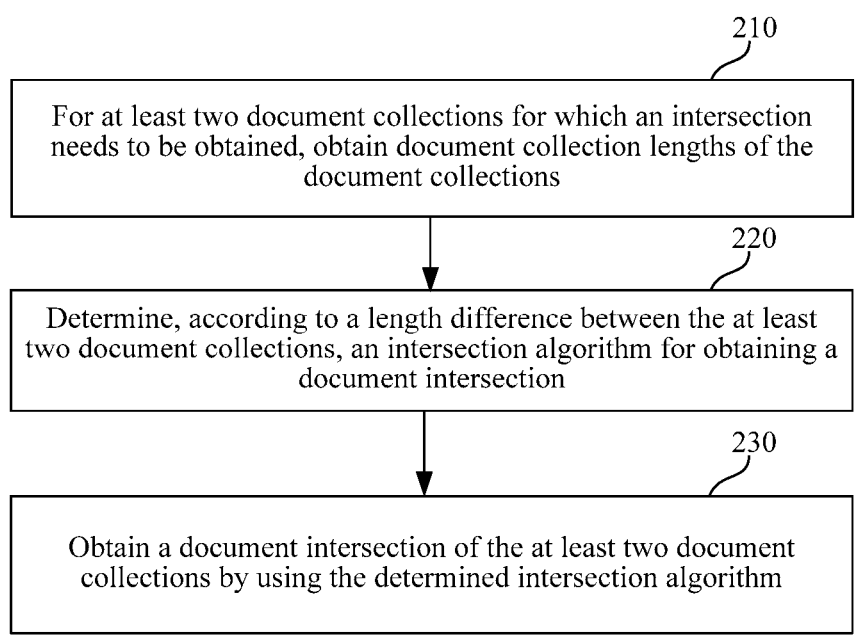
FIG. 2 is a flowchart of a method of obtaining an intersection of a plurality of documents according to an embodiment of the present disclosure.

FIG. 2 is a flowchart of the steps of a method of obtaining an intersection of a plurality of documents.

Step 210: For at least two document collections for which an intersection needs to be obtained, obtain document collection lengths of the document collections.

In an index database, different word segments of a search term may match different quantities of documents. Due to difference levels of use popularity of different word segments, a length difference between the at least two document collections for which an intersection needs to be obtained in a search may exceed a length threshold. It should be noted that a length of a document collection is a quantity of document elements included in the document collection.

In this embodiment of the present disclosure, for the document collections for which an intersection needs to be obtained that are generated corresponding to the word segments, a length of each document collection is obtained. Specifically, a quantity of documents in each document collection may be obtained.

For example, if the user inputs a search term "Haidilao Hot Pot" into the search engine browser 140, word segment 1 "Haidilao" and word segment 2 "Hot Pot" can be obtained. For word segment 1 and word segment 2, documents obtained through corresponding queries are shown in the following Table 1:

TABLE 1

| Haidilao | Hot Pot |
| --- | --- |
| Document 1 | Document 1 |
| Document 2 | Document 3 |
| Document 20 | Document 5 |
| Document 85 | Document 6 |
| | . . . |
| | Document 20 |
| | . . . |
| | Document 80 |

Therefore, the documents obtained through queries corresponding to each word segment are sorted in ascending order of values of document identifiers, so that Table 1 may be obtained. A quantity of document elements in a first document collection corresponding to word segment 1 "Haidilao" is 4, and a quantity of document elements in a second document collection corresponding to word segment 2 "Hot Pot" is 40 (there are omissions between document 6 and document 20 and between document 20 to document 80). In this way, it may be obtained that a length of the first document collection corresponding to word segment 1 "Haidilao" is 4, and a length of the second document collection corresponding to word segment 2 "Hot Pot" is 40.

Step 220: Compare the lengths of the at least two document collections to determine, according to a length difference between the at least two document collections, an intersection algorithm for obtaining a document intersection.

Step 230: Obtain a document intersection of the at least two document collections by using the determined intersection algorithm.

In this embodiment of the present disclosure, if the lengths of the at least two document collections meet a preset condition, a query element in the shortest document collection may be used as a traversal starting point to search each of the remaining document collections for the query element. The shortest document collection is one of the at least two document collections that has the shortest document collection length. The preset condition may be that a length difference between the longest document collection and the shortest document collection of a plurality of document collections is greater than a first preset threshold. The first preset threshold may be set according to an actual case, for example, may be a preferred value obtained by performing a routine search test on the search engine. It should be noted that the preset condition may be alternatively that a ratio of the longest document collection length to the shortest document collection length of a plurality of document collections exceeds a second preset threshold.

For the data in Table 1, if the preset condition is that a length difference between the longest document collection and the shortest document collection of a plurality of document collections is greater than 10, given that a length difference between the first document collection and the second document collection is 30, the preset condition is met. In this case, document 1 in the first document collection is used as a query element to traverse the second document collection. It is found that document 1 exists in the second document collection, and document 1 is inserted into a document intersection. Document 2 in the first document collection is then used as a query element to traverse the second document collection. It is found that document 2 does not exist in the second document collection. Next, document 20 in the first document collection is selected as a query element. It is found that document 20 exists in the second document collection. After document 20 is inserted into the document intersection, document 85 in the first document collection is used as a query element to traverse the second document collection. Finally, it is found that document 85 does not exist in the second document collection, and the first document collection has been completely traversed. In this way, this process of obtaining an intersection may be terminated, and a final document intersection [document 1, document 20] is returned to the user.

According to a common intersection algorithm, for Table 1, an approximate process of obtaining an intersection is as follows: Document 1 in the first document collection is used as a query element to traverse the second document collection. It is found that document 1 exists in the second document collection, and document 1 is inserted into a document intersection. Document 2 in the first document collection is then used as a query element to traverse the second document collection. It is found that document 2 does not exist in the second document collection. Document 3 in the second document collection is used as a query element to traverse the first document collection. Document 3 does not exist in the first document collection. Document 20 in the first document collection is used as a query element. It is found that document 20 exists in the second document collection. Document 20 is then inserted into the document intersection. Document 85 in the first document collection is used as a query element. Finally, it is found that document 85 does not exist in the second document collection, and the first document collection has been completely traversed. In this way, this process of obtaining an intersection may be terminated, and a final document intersection [document 1, document 20] is returned to the user. Obviously, in the common intersection algorithm, the traversal for the first document collection by using document 3 is a waste. In fact, document 3 is not included in the first document collection, that is, document 3 will never be inserted into the document intersection. Therefore, if the length difference between the at least two document collections exceeds the length threshold, the efficiency of obtaining an intersection by using the common intersection algorithm is relatively low.

For example, if the user queries "Haidilao Hot Pot" by using a search engine on a browser of a computer, web pages corresponding to document 1 and document 20 are results that are obtained through this query of the user, and links of the web pages corresponding to document 1 and document 20 are displayed to the user by using an interface of the browser.

In addition, if the user queries "Haidilao Hot Pot" by using a search engine in an application on a mobile phone, application pages corresponding to document 1 and document 20 are results that are obtained through this query of the user, and links of the application pages corresponding to document 1 and document 20 are displayed to the user through an interface of the mobile phone.

In conclusion, this embodiment of the present disclosure provides a method of obtaining an intersection of a plurality of documents. For at least two document collections for which an intersection needs to be obtained in a search, when document collection lengths of at least two document collections meet a preset condition, an element in a document collection with the shortest length is used as a query element to sequentially traverse the remaining document collections. Therefore, the efficiency of obtaining a document intersection can be effectively improved, and a response time of a search engine for a user is shortened.

Figure 3:
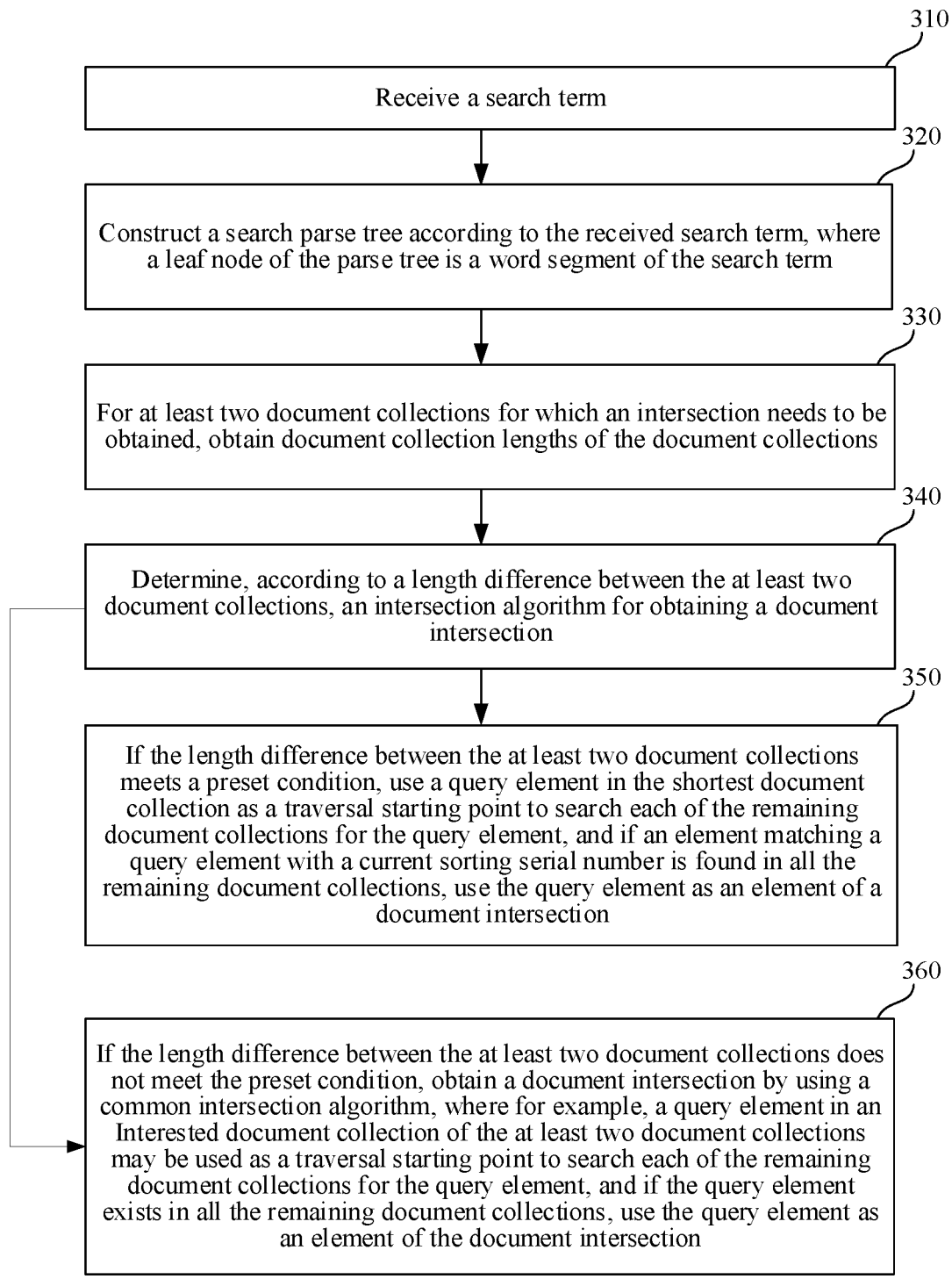
FIG. 3 is a flowchart of a method of obtaining an intersection of a plurality of documents according to another embodiment of the present disclosure.

FIG. 3 is a flowchart of specific steps of a method of obtaining an intersection of a plurality of documents.

Step 310: Receive a search term.

In this embodiment of the present disclosure, the search engine may receive the search term input by the user, and construct a parse tree for the search term.

Step 320: Construct a search parse tree according to the received search term, where a leaf node of the parse tree is a word segment of the search term.

In this embodiment of the present disclosure, the search term input by the user may be syntactically parsed and the parse tree may be constructed. For example, a rule is set that when an additional space is found through syntactical parsing, it is determined that the word before the additional space and the word after the additional space have an "and" relationship. Assuming that the user inputs "Beijing city OurHours convenience store", the words "Beijing city" before the additional space and the words "OurHours convenience store" after the additional space are stored, and a parsing result is constructed to be a basic parse tree shown in FIG. 3A.

Figure 3A:
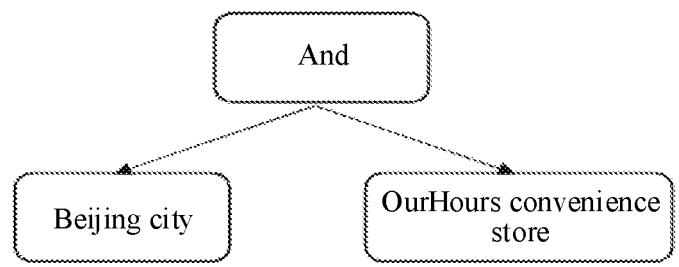
FIG. 3A is a structural diagram of a basic parse tree according to an embodiment of the present disclosure.

Next, an ultimate parse tree node is synchronously constructed according to the structure of the basic parse tree shown in FIG. 3A. In this process, a system determines whether the node of the basic parse tree is text. If the node is text, the system performs word segmentation on the search term again. For example, "Beijing city" is segmented into "Beijing" and "city", and "OurHours convenience store" is segmented into "OurHours", "convenience", and "store". The basic parse tree may be reconstructed based on a result obtained after word segmentation, and an "and" node after word segmentation is added to the basic parse tree to form the ultimate parse tree shown in FIG. 3B, so that the search engine performs an intersection algorithm on each word segment on the ultimate parse tree.

Step 330: For at least two document collections for which an intersection needs to be obtained, obtain document collection lengths of the document collections.

For a basic implementation of this step, refer to the foregoing Step 210, and details are not described herein again.

In addition, for the search parse tree constructed in Step 320, starting from a bottom-layer intersection node on which intersection calculation has not been performed in the search parse tree, the at least two document collections for which an intersection needs to be obtained are determined according to subnodes of the intersection node, and the document collection lengths of the at least two document collections are determined.

In this embodiment of the present disclosure, intersection calculation may be started from a bottom-layer intersection node in the search parse tree that is constructed according to the search term. After intersection calculation for the bottom-layer intersection node is finished, intersection calculation is performed on an upper-layer intersection node according to an obtained bottom-layer document intersection until a top-layer document intersection is obtained, and the top-layer document intersection is returned to the user.

Figure 3B:
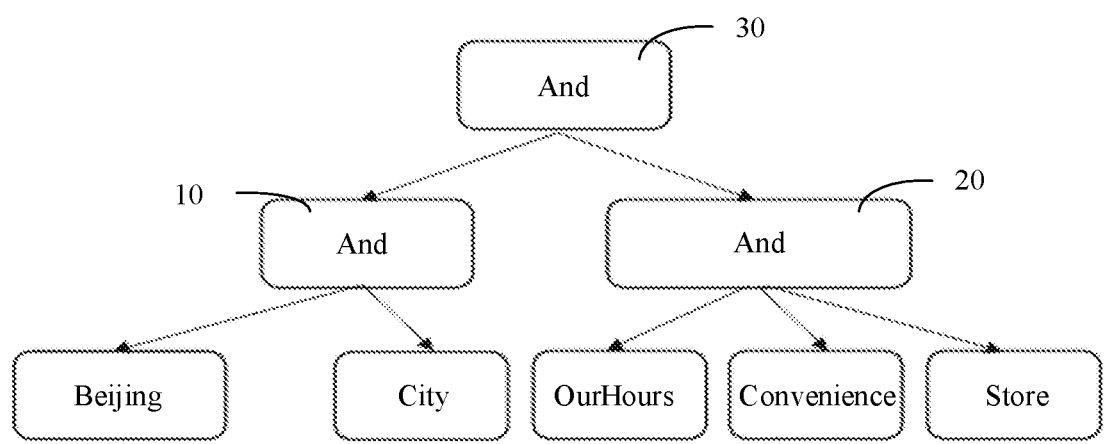
FIG. 3B is a structural diagram of an ultimate parse tree according to an embodiment of the present disclosure.

For example, in the ultimate parse tree for "Beijing city OurHours convenience store" shown in FIG. 3B, intersection nodes 10 and 20 are bottom-layer nodes, and an intersection node 30 is a top-layer node. In this case, according to the bottom-layer node 10 and the bottom-layer node 20, document collections for which an intersection needs to be obtained of the top-layer node 30 are determined to be document collections corresponding to "Beijing" and "city" and document collections corresponding to "OurHours", "convenience", and "store".

Subsequently, quantities of document elements in document collections that separately correspond to "Beijing" and "city" and quantities of document elements in document collections that separately correspond to "OurHours", "convenience", and "store" can be separately obtained.

Step 340: Compare the lengths of the at least two document collections to determine, according to a length difference between the at least two document collections, an intersection algorithm for obtaining a document intersection.

Step 350: If the length difference between the at least two document collections meets a preset condition, use a query element in the shortest document collection as a traversal starting point to search each of the remaining document collections for the query element, and if an element matching a query element with a current sorting serial number is found in all the remaining document collections, use the query element as an element of a document intersection, where the shortest document collection is one of the at least two document collections that has the shortest document collection length.

The preset condition may include: a difference between the longest document collection length and the shortest document collection length of the document collection lengths of the at least two document collections exceeds a first preset threshold; and a ratio of the longest document collection length to the shortest document collection length of the at least two document collections exceeds a second preset threshold. The first preset threshold and the second preset threshold may both be set according to an actual case. For example, a preferred value may be obtained by performing a routine search test on the search engine.

A query element with a current sorting serial number in the shortest document collection may be matched against elements in each of the remaining document collections. If no element matching the query element with the current sorting serial number is found in at least one of the remaining document collections, a query element with a next sorting serial number in the shortest document collection is matched against the elements in each of the remaining document collections. If an element matching the query element with the current sorting serial number is found in all the remaining document collections, the query element is used as an element of the document intersection, and a query element with a next sorting serial number in the shortest document collection is matched against the elements in the remaining document collections. The process is repeated until all the elements in the shortest document collection have been traversed.

For example, for the intersection node 10 in the ultimate parse tree of "Beijing city OurHours convenience store" shown in FIG. 3B, it is assumed that a quantity of document elements in the first document collection of the word segment "Beijing" is 4, a quantity of document elements in the second document collection of the word segment "city" is 40, the first preset threshold is 10, and document elements that separately correspond to the word segments "Beijing" and "city" are shown in the following Table 2.

Because a length difference 30 between the first document collection and the second document collection is greater than the first preset threshold of 10, in this case, document 1 in the first document collection is used as a query element to traverse the second document collection.

TABLE 2

| Beijing | City |
| --- | --- |
| Document 1 | Document 1 |
| Document 2 | Document 3 |
| Document 20 | Document 5 |
| Document 85 | Document 6 |
|  | ... |
|  | Document 20 |
|  | ... |
|  | Document 80 |

Optionally, elements in the document collections are already sorted in ascending order or descending order of values of identifiers.

TABLE 3

| Beijing | City |
| --- | --- |
| Document 85 | Document 80 |
| Document 20 | ... |
| Document 2 | Document 20 |
| Document 1 | ... |
| | Document 6 |
| | Document 5 |
| | Document 3 |
| | Document 1 |

In this embodiment of the present disclosure, an identifier of an element in the document collections is a corresponding number adjacent to a document in Table 2. The identifier is used to identify the document element. Table 2 is obtained by sorting elements in the document collections in ascending order of values of identifiers. If the elements in the document collections are sorted in descending order of values of the identifiers, Table 3 is obtained. In this case, the first element, that is, document 85, in the first document collection is used as a query element for traversal, and this is not limited in this embodiment of the present disclosure.

When document 1 in the first document collection is used as a query element to traverse the second document collection, and it is found that document 1 exists in the second document collection, document 1 is inserted into a document collection. Document 2 in the first document collection is then used as a query element to traverse the second document collection, and it is found that document 2 does not exist in the second document collection. In this case, document 20 in the first document collection is chosen as a query element to traverse the second document collection, and it is found that document 20 exists in the second document collection. Document 20 is then inserted into the document collection. Finally, the last document 85 in the first document collection is used as a query element to traverse the second document collection, and it is found that document 85 does not exist in the second document collection. The traversal then stops. Subsequently, a document intersection [document 1, document 20] for the intersection node 10 is returned to the top-layer intersection node 30 shown in FIG. 3B.

Step 360: If the length difference between the at least two document collections does not meet the preset condition, obtain a document intersection by using a common intersection algorithm. For example, a query element in an interested document collection of the at least two document collections may be used as a traversal starting point to search each of the remaining document collections for the query element, and if the query element exists in all the remaining document collections, the query element is used as an element of the document intersection. A previous query element is from the interested document collection and the previous query element is determined as an element of the document intersection. Or the interested document collection is first determined not to have the previous query element, and a sorting serial number of the query element is a next sorting serial number of the previous query element.

In this embodiment of the present disclosure, a query element with the smallest sorting serial number in the first document collection of the at least two document collections may be used as a traversal starting point to search each of the remaining document collections for the query element. If no element matching the query element with a current sorting serial number is found in a remaining document collection that is currently searched, an element with a next sorting serial number in the remaining document collection is used as a new query element. If an element matching the query element with the current sorting serial number is found in all the remaining document collections, the query element is used as an element of the document intersection, and an element with a next sorting serial number in the document collection from which the query element is selected is used as a new query element. The process is repeated until all the elements in one of the at least two document collections have been completely traversed.

In this embodiment of the present disclosure, for the intersection node 20 in the ultimate parse tree for "Beijing city OurHours convenience store" shown in FIG. 3B, it is assumed that a quantity of document elements in a third document collection corresponding to the word segment "OurHours" is 2, a quantity of document elements in a fourth document collection corresponding to the word segment "convenience" is 3, a quantity of document elements in a fifth document collection corresponding to the word segment "store" is 4, a first preset threshold is 10, and document elements that separately correspond to the word segments "OurHours", "convenience", and "store" are shown in the following Table 4.

TABLE 4

| OurHours | Convenience | Store |
| --- | --- | --- |
| Document 1 | Document 2 | Document 20 |
| Document 20 | Document 20 | Document 40 |
| | Document 21 | Document 50 |
| | | Document 60 |

In this case, because a document collection length difference 2 between the longest fifth document collection and the shortest third document collection is less than the first preset threshold of 10, intersection calculation between the third document collection, the fourth document collection, and the fifth document collection may be performed by using the common intersection algorithm, which is specifically as follows: document 1 in the third document collection is used as a query element to traverse the fourth document collection, and it is found that document 1 does not exist in the fourth document collection. In this case, document 2 in the fourth document collection is used as a query element. It is found that document 2 does not exist in the fifth document collection. In this case, document 20 in the fifth document collection is used as a query element. It is found that document 20 exists in both the third document collection and the fourth document collection, and document 20 is inserted into a document intersection corresponding to the intersection node 20. After it is found that document 20 exists in both the third document collection and the fourth document collection, document 40 in the fifth document collection is used as a query element. It is found that document 40 does not exist in the third document collection, and the third document collection has been completely traversed. In this case, the query stops, and the document intersection [document 20] corresponding to the intersection node 20 is uploaded to the top-layer intersection node 30. If a length difference between document collections corresponding to the word segments is relatively small, when the common intersection algorithm is used, the query efficiency can be improved.

Based on the foregoing processing, in the ultimate parse tree for "Beijing city OurHours convenience store" shown in FIG. 3B, document collections corresponding to the intersection node 30 are separately the document intersection

[document 1, document 20] corresponding to the intersection node 10 and the document intersection [document 20] corresponding to the intersection node 20. In this case, an intersection may be obtained for the intersection node 30, so that a final document intersection [document 20] is obtained and returned to the user.

For the foregoing method of obtaining an intersection of a plurality of documents provided in the present disclosure, based on a test of a test system, there is improvement in indicators about response delay including TP90, TP99, and TP999, and the improvement is more than 10%. A TP90 time is a lowest time consumption that meets 90% of requests; a TP99 time is a lowest time consumption that meets 99% of requests; and a TP999 time is a lowest time consumption that meets 99.9% of requests.

In conclusion, in the foregoing method of obtaining an intersection of a plurality of documents provided in this embodiment of the present disclosure, when document collection lengths of at least two document collections for which an intersection needs to be obtained in a search meet a preset condition, an element in a document collection with the shortest length is used as a query element to sequentially traverse the remaining document collections. Therefore, the efficiency of obtaining a document intersection can be effectively improved, and a response time of a search engine for a user is shortened.

Figure 4:
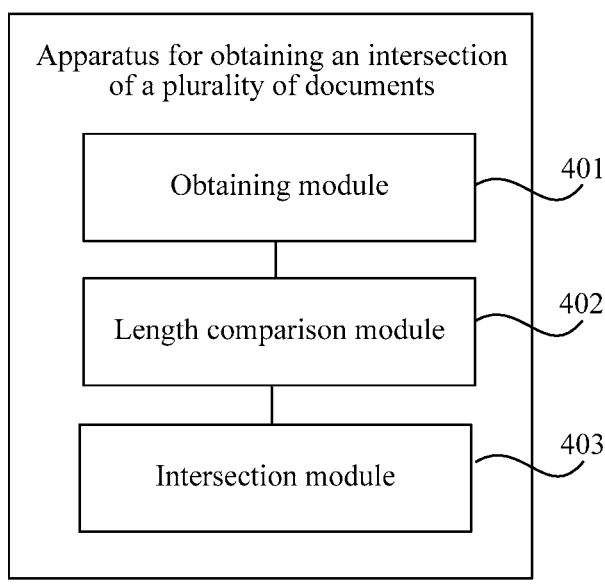
FIG. 4 is a schematic structural diagram of an apparatus for obtaining an intersection of a plurality of documents according to an embodiment of the present disclosure.

FIG. 4 is a structural diagram of an apparatus for obtaining an intersection of a plurality of documents.

As shown in FIG. 4, the apparatus for obtaining an intersection of a plurality of documents may include: an obtaining module 401, configured to: for at least two document collections for which an intersection needs to be obtained in a search, obtain document collection lengths of the document collections; a length comparison module 402, configured to compare the lengths of the at least two document collections to determine an intersection algorithm for obtaining a document intersection; and an intersection module 403, configured to obtain an intersection of the at least two document collections according to the determined intersection algorithm.

In conclusion, this embodiment of the present disclosure provides an apparatus for obtaining an intersection of a plurality of documents. When document collection lengths of at least two document collections for which an intersection needs to be obtained in a search meet a preset condition, an element in a document collection with the shortest length is used as a query element to sequentially traverse the remaining document collections. Therefore, the efficiency of obtaining a document intersection can be effectively improved, and a response time of a search engine for a user is shortened.

Figure 5:
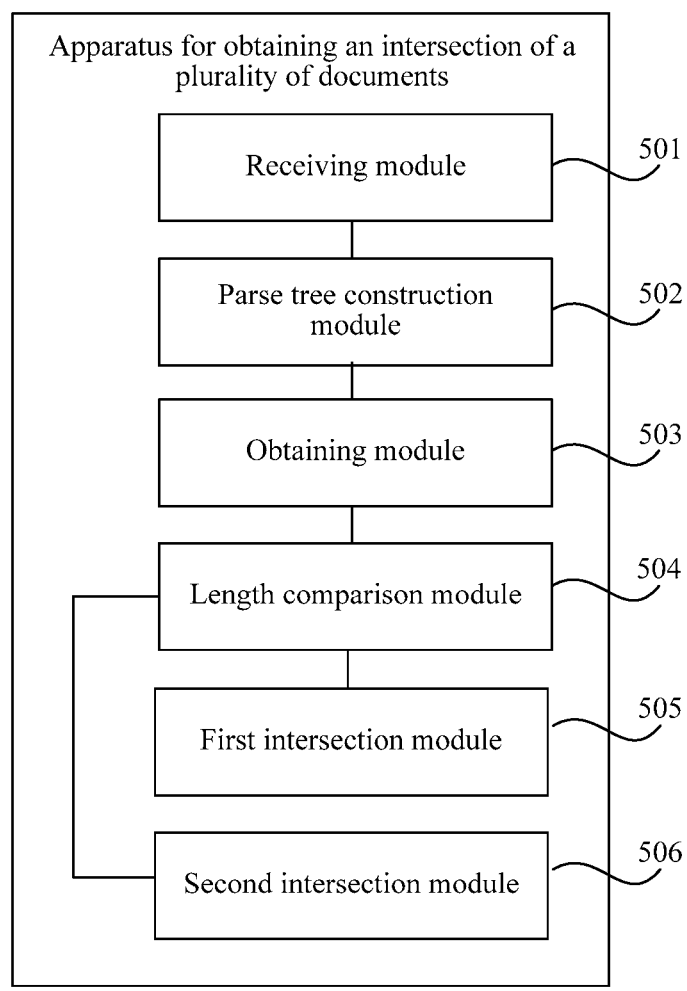
FIG. 5 is a schematic structural diagram of an apparatus for obtaining an intersection of a plurality of documents according to another embodiment of the present disclosure.

FIG. 5 is a specific structural diagram of an apparatus for obtaining an intersection of a plurality of documents.

As shown in FIG. 5, the apparatus for obtaining an intersection of a plurality of documents may include:

a receiving module 501, configured to receive a search term;

a parse tree construction module 502, configured to construct a parse tree of the search according to the search term, where a leaf node of the parse tree is a word segment of the search term;

an obtaining module 503, configured to: for at least two document collections for which an intersection needs to be obtained in a search, obtain document collection lengths of the document collections;

a length comparison module 504, configured to compare the lengths of the at least two document collections to determine an intersection algorithm for obtaining a document intersection;

a first intersection module 505, configured to: if a length difference between the at least two document collections meets a preset condition, use a query element in the shortest document collection as a traversal starting point to search each of the remaining document collections for the query element; and when the query element exists in each of the remaining document collection, use the query element as an element of the document intersection, where the shortest document collection is one of the at least two document collections that has the shortest document collection length; and a second intersection module 506, configured to: if the length difference between the at least two document collections does not meet the preset condition, use a common intersection algorithm to obtain the document intersection. For example, a query element in an interested document collection of the at least two document collections may be used as a traversal starting point to search each of the remaining document collections for the query element; and when the query element exists in each of the remaining document collections, use the query element as an element of the document intersection. A previous query element is from the interested document collection and the previous query element is determined as an element of the document intersection. Or the interested document collection is first determined not to have the previous query element does not exist and a sorting serial number of the query element is a next sorting serial number of the previous query element.

The obtaining module 503 may be specifically configured to: starting from a first bottom-layer intersection node on which intersection calculation has not been performed in the parse tree of the search, determine, according to subnodes of the first intersection node, the at least two document collections for which an intersection needs to be obtained; and obtain the document collection length of each document collection.

The first intersection module 505 may be specifically configured to: match a query element with a current sorting serial number in the shortest document collection against elements in the remaining document collections; if no element matching the query element with the current sorting serial number is found in at least one of the remaining document collections, match a query element with a next sorting serial number in the shortest document collection against the elements in the remaining document collections; and if an element matching the query element with the current sorting serial number is found in all the remaining document collections, use the query element as an element of the document intersection, and match a query element with a next sorting serial number in the shortest document collection against the elements in the remaining document collections. The process is repeated until all the elements in the shortest document collection have been traversed.

The second intersection module 506 may be specifically configured to: use a query element with the smallest sorting serial number in the first document collection of the at least two document collections as an initial traversal starting point to search each of the remaining document collections for the query element; if no element matching the query element with a current sorting serial number is found in a remaining document collection that is currently searched, use an element with a next sorting serial number in the remaining document collection as a new query element; and if an element matching the query element with the current sorting serial number is found in all the remaining document collections, use the query element as an element of the document intersection, and use an element with a next sorting serial number in the document collection from which the query element is selected as a new query element. The process is repeated until all the elements in one of the at least two document collections have been completely traversed.

In conclusion, this embodiment of the present disclosure provides an apparatus for obtaining an intersection of a plurality of documents. When document collection lengths of at least two document collections for which an intersection needs to be obtained in a search meet a preset condition, an element in a document collection with the shortest length is used as a query element to sequentially traverse the remaining document collections. Therefore, when a document collection length difference is relatively large, the efficiency of obtaining a document intersection can be effectively improved, and a response time of a search engine for a user is shortened.

An embodiment of the present disclosure further provides a document server. The document server includes: a processor; and a non-transitory computer readable storage medium, where the non-transitory computer readable storage medium stores machine executable instructions executable by the processor. The processor is enabled by the machine executable instructions to perform the steps in the method of obtaining an intersection of a plurality of documents in the foregoing embodiments, for example: for at least two document collections for which an intersection needs to be obtained in a search, obtaining document collection lengths of the document collections; determining, according to a length difference between the at least two document collections, an intersection algorithm for obtaining a document intersection; and obtaining a document intersection of the at least two document collections by using the determined intersection algorithm.

An embodiment of the present disclosure further provides a non-transitory computer readable storage medium. When instructions in the storage medium are executed by a processor in a document server, the document server is capable of performing the method of obtaining an intersection of a plurality of documents in the foregoing embodiments.

The apparatus embodiment is basically similar to the method embodiment, and is therefore described briefly. For related parts, refer to partial descriptions in the method embodiment.

Algorithms and displaying provided herein are not inherently related to any particular computer, a virtual system, or another device. Various general purpose systems may also be used together with teachings herein. According to the foregoing descriptions, a structure required for constructing such a system is obvious. In addition, the present disclosure is not specifically limited to any particular programming language. It should be understood that the content in the present disclosure described herein may be implemented by using various programming languages, and the foregoing description of the particular language is intended to disclose an optimal implementation of the present disclosure.

A large number of specific details are described in the specification provided herein. However, it can be understood that the embodiments of the present disclosure may be implemented without these specific details. In some examples, known methods, structures, and technologies are not disclosed in detail, so as not to obscure understanding on the specification.

Similarly, it should be understood that to simplify the present disclosure and help to understand one or more of the inventive aspects, in the foregoing descriptions of the exemplary embodiments of the present disclosure, features of the present disclosure are sometimes grouped into a single embodiment or figure, or descriptions thereof. However, the methods in the present disclosure should not be construed as reflecting the following intention: that is, the present disclosure claimed to be protected is required to have more features than those clearly set forth in each claim. Or rather, as reflected in the following claims, the inventive aspects aim to be fewer than all features of a single embodiment disclosed above. Therefore, the claims complying with a specific implementation are definitely combined into the specific implementation, and each claim is used as a single embodiment of the present disclosure.

Persons skilled in the art may understand that modules in the device in the embodiments may be adaptively changed and disposed in one or more devices different from that in the embodiments. Modules, units, or components in the embodiments may be combined into one module, unit, or component, and moreover, may be divided into a plurality of sub-modules, subunits, or subcomponents. Unless that at least some of such features and/or processes or units are mutually exclusive, all features disclosed in this specification (including the appended claims, abstract, and drawings) and all processes or units in any disclosed method or device may be combined by using any combination. Unless otherwise definitely stated, each feature disclosed in this specification (including the appended claims, abstract, and drawings) may be replaced with a replacement feature providing a same, an equivalent, or a similar objective.

The component embodiments of the present disclosure may be implemented by using hardware, may be implemented by using software modules running on one or more processors, or may be implemented by using a combination thereof. A person skilled in the art should understand that some or all functions of some or all components of the document server according to the embodiments of the present disclosure may be implemented by using a microprocessor or a digital signal processor (DSP) in practice. The present disclosure may further be implemented as a device or an apparatus program configured to perform some or all of the methods described herein. Such program for implementing the present disclosure may be stored on a computer readable medium, or may have one or more signal forms. Such signals may be downloaded from an Internet website, may be provided from a carrier signal, or may be provided in any other forms.

It should be noted that the foregoing embodiments are descriptions of the present disclosure rather than limitations on the present disclosure, and a person skilled in the art may design a replacement embodiment without departing from the scope of the appended claims. In the claims, any reference symbol located between brackets should not constitute a limitation on the claims. The word "comprise" does not exclude an element or a step not listed in the claims. The word "a" or "one" located before an element does not exclude existence of a plurality of such elements. The present disclosure may be implemented by hardware including several different elements and an appropriately programmed computer. In the unit claims listing several apparatuses, some of the apparatuses may be specifically embodied by using the same hardware. Use of the words such as "first", "second", and "third" does not indicate any sequence. These words may be construed as names.

The invention claimed is:

1. A method of obtaining an intersection of a plurality of documents, the method being implemented by a computing system, comprising:
   for at least two document collections for which an intersection is to be obtained in a digital search, obtaining document collection lengths of the document collections, wherein the document collection length of the document collection indicates a quantity of documents in the document collection;
   determining, according to a length difference between the at least two document collections, an intersection algorithm for obtaining a document intersection; and
   obtaining a document intersection of the at least two document collections by using the determined intersection algorithm; and,
   wherein obtaining the document intersection of the at least two document collections by using the determined intersection algorithm comprises:
   when the length difference between the at least two document collections meets a preset condition, using a query element in the shortest document collection as a traversal starting point to search each of remaining document collections for the query element, wherein the shortest document collection is one of the at least two document collections that has the shortest document collection length; and
   when the query element exists in each of the remaining document collections, using the query element as an element of the document intersection, wherein the preset condition comprises any one or more of the following:
   a difference between the longest document collection length and the shortest document collection length of the at least two document collections exceeds a first preset threshold; or
   a ratio of the longest document collection length to the shortest document collection length of the at least two document collections exceeds a second preset threshold.

2. The method according to claim 1, wherein using the query element in the shortest document collection as the traversal starting point to search each of the remaining document collections for the query element comprises:
   matching a query element with a current sorting serial number in the shortest document collection against elements in the remaining document collections;
   when no element matching the query element with the current sorting serial number is found in at least one of the remaining document collections, matching a query element with a next sorting serial number in the shortest document collection against the elements in the remaining document collections; and
   when an element matching the query element with the current sorting serial number is found in all the remaining document collections,
   using the query element with the current sorting serial number as an element of the document intersection, and matching the query element with the next sorting serial number in the shortest document collection against the elements in the remaining document collections.

3. The method according to claim 1, wherein elements in each of the at least two document collections are sorted in ascending order or descending order of values of identifiers to have sorting serial numbers.

4. The method according to claim 1, further comprising:
   receiving a search term to trigger the search; and
   constructing a parse tree of the search according to the search term, wherein a leaf node of the parse tree is a word segment of the search term.

5. The method according to claim 4, wherein for the at least two document collections for which the intersection needs to be obtained in the search, obtaining the document collection lengths of the document collections comprises:
   starting from a bottom-layer intersection node on which intersection calculation has not been performed in the parse tree of the search, determining, according to subnodes of the bottom-layer intersection node, the at least two document collections for which the intersection needs to be obtained; and
   obtaining a document collection length of each of the at least two document collections.

6. The method according to claim 1, wherein obtaining the document intersection of the at least two document collections by using the determined intersection algorithm comprises:
   when the length difference between the at least two document collections does not meet the preset condition, using a query element in an interested document collection of the at least two document collections as a traversal starting point to search each of remaining document collections for the query element; and
   when the query element exists in each of the remaining document collections, using the query element as an element of the document intersection, wherein
   a previous query element is from the interested document collection and the previous query element is determined as an element of the document intersection; or
   the interested document collection is first determined not to have the previous query element and a sorting serial number of the query element is a next sorting serial number of the previous query element.

7. A document server, comprising:
   a processor; and
   a non-transitory computer readable storage medium, wherein the non-transitory computer readable storage medium stores machine executable instructions executable by the processor, and
   the processor is enabled by the machine executable instruction to:
   for at least two document collections for which an intersection needs to be obtained in a search, obtain document collection lengths of the document collections, wherein the document collection length of the document collection indicates a quantity of documents in the document collection;
   determine, according to a length difference between the at least two document collections, an intersection algorithm for obtaining a document intersection; and
   obtain a document intersection of the at least two document collections by using the determined intersection algorithm; and,
   wherein obtaining the document intersection of the at least two document collections by using the determined intersection algorithm comprises:
   when the length difference between the at least two document collections meets a preset condition, using a query element in the shortest document collection as a traversal starting point to search each of remaining document collections for the query element, wherein the shortest document collection is one of the at least two document collections that has the shortest document collection length; and when the query element exists in each of the remaining document collections, using the query element as an element of the document intersection, wherein the preset condition comprises any one or more of the following:

a difference between the longest document collection length and the shortest document collection length of the at least two document collections exceeds a first preset threshold; or a ratio of the longest document collection length to the shortest document collection length of the at least two document collections exceeds a second preset threshold.

8. The document server according to claim 7, wherein when using the query element in the shortest document collection as the traversal starting point to search each of the remaining document collections for the query element, the processor is enabled by the machine executable instruction to:

match a query element with a current sorting serial number in the shortest document collection against elements in the remaining document collections;

when no element matching the query element with the current sorting serial number is found in at least one of the remaining document collections, match a query element with a next sorting serial number in the shortest document collection against the elements in the remaining document collections; and when an element matching the query element with the current sorting serial number is found in all the remaining document collections, use the query element with the current sorting serial number as an element of the document intersection, and match the query element with the next sorting serial number in the shortest document collection against the elements in the remaining document collections.

9. The document server according to claim 7, wherein elements in each of the at least two document collections are sorted in ascending order or descending order of values of identifiers to have sorting serial numbers.

10. The document server according to claim 7, wherein the processor is further enabled by the machine executable instruction to:

receive a search term used to trigger the search; and construct a parse tree of the search according to the search term, wherein a leaf node of the parse tree is a word segment of the search term.

11. The document server according to claim 10, wherein when obtaining the document collection lengths of the document collections for the at least two document collections for which an intersection needs to be obtained in the search, the processor is enabled by the machine executable instruction to:

starting from a bottom-layer intersection node on which intersection calculation has not been performed in the parse tree of the search, determine, according to sub-nodes of the bottom-layer intersection node, the at least two document collections for which the intersection needs to be obtained; and obtain a document collection length of each of the at least two document collections.

12. The document server according to claim 7, wherein when obtaining the document intersection of the at least two document collections by using the determined intersection algorithm, the processor is enabled by the machine executable instruction to:

when the length difference between the at least two document collections does not meet the preset condition, use a query element in an interested document collection of the at least two document collections as a traversal starting point to search each of remaining document collections for the query element; and when the query element exists in each of the remaining document collections, use the query element as an element of the document intersection, wherein a previous query element is from the interested document collection and the previous query element is determined as an element of the document intersection; or the interested document collection is first determined not to have the previous query element and a sorting serial number of the query element is a next sorting serial number of the previous query element.

13. A non-transitory computer readable storage medium, wherein the non-transitory computer readable storage medium stores machine executable instructions executable by a processor, and when the machine executable instructions in the non-transitory computer readable storage medium are executed by a processor in a document server, the document server is capable of performing operations comprising:

for at least two document collections for which an intersection needs to be obtained in a search, obtaining document collection lengths of the document collections, wherein the document collection length of the document collection indicates a quantity of documents in the document collection;

determining, according to a length difference between the at least two document collections, an intersection algorithm for obtaining a document intersection; and obtaining a document intersection of the at least two document collections by using the determined intersection algorithm; and, wherein obtaining the document intersection of the at least two document collections by using the determined intersection algorithm comprises:

when the length difference between the at least two document collections meets a preset condition, using a query element in the shortest document collection as a traversal starting point to search each of remaining document collections for the query element, wherein the shortest document collection is one of the at least two document collections that has the shortest document collection length; and when the query element exists in each of the remaining document collections, using the query element as an element of the document intersection, wherein the preset condition comprises any one or more of the following:

a difference between the longest document collection length and the shortest document collection length of the at least two document collections exceeds a first preset threshold; or a ratio of the longest document collection length to the shortest document collection length of the at least two document collections exceeds a second preset threshold.

* * * * *